Oct. 28, 1947.　　W. A. MINER, JR　　2,429,641
TELEPHONE DROP
Filed July 2, 1946

INVENTOR.
Walter A. Miner, Jr.
BY
ATTORNEY

Patented Oct. 28, 1947

2,429,641

UNITED STATES PATENT OFFICE 2,429,641

TELEPHONE DROP

Walter A. Miner, Jr., New York, N. Y., assignor to Federal Telephone and Radio Corporation, New York, N. Y., a corporation of Delaware Application July 2, 1946, Serial No. 680,884

3 Claims. (Cl. 177—329)

The present invention relates to telephone drops and in particular to silent signals for telephones.

For some applications of telephones, particularly of field telephones, it is desirable to provide a drop signal which operates practically silent or at least without producing noise to be heard beyond a limited area.

It is also essential in the use of telephones under water or in the tropics as well as in a climate of high humidity to protect the electric wiring and parts from atmospheric deterioration.

It is, therefore, an object of the present invention to provide means for arranging certain electrical equipment within a sealed housing and other or certain non-electrical equipment such as a signal flag outside of the housing.

It is another object to provide permanent magnetic means on one side of a panel for retaining a signal flag in one position on the other side of the panel, together with spring means for moving the signal flag into another position upon neutralization of the permanent magnetic means.

With these and other objects in view the present invention will become apparent and will be clearly understood in connection with the accompanying drawing, in which.

Figure 1:
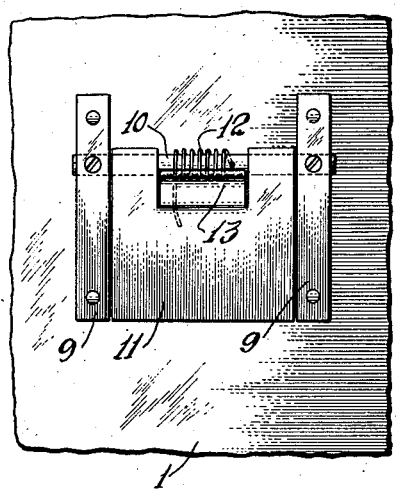
Figure 1 is a front elevational view of the drop.
Figure 3:
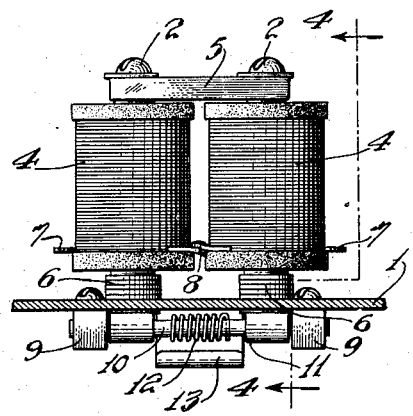
Fig. 3 is a plan view of the drop.
Figure 2:
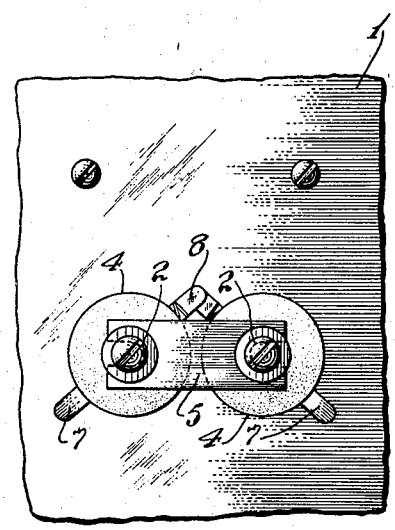
Fig. 2 is a rear elevational view of the drop.

Referring to the drawings, the drop comprises a mounting plate or panel 1, which, in accordance with the present invention, preferably forms a part of a housing, sealing up the electrical parts of the drop. Two parallel pins 2 extend through openings in plate 1 for threaded engagement with nuts 3 on the outside of the housing. The pins 2 are used as cores for coils 4. A permanent bar magnet 5 connects the inner ends of the pins 2. Spacer washers 6 are provided on each pin 2 for spacing purposes and to insure proper sealing of the openings in plate 1. Contact lugs 7 and 8, respectively, provide proper electrical connection to the coils 4.

Figure 4:
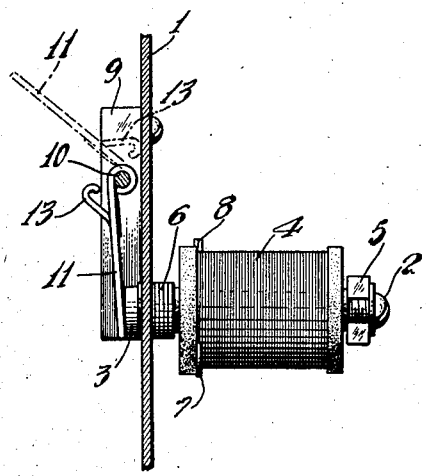
Fig. 4 is a sectional view along the lines 4—4 of Fig. 3.

The mounting plate 1 supports also on its outside two parallel arranged bars 9 in which a pivot 10 and a spring 12 tends to keep the signal flag 11 in the lifted position. Preferably a portion 13 of the signal flag 11 is cut and bent out of its plane to provide an abutment to determine the upper position such as position shown in broken lines in Fig. 4. The permanent bar magnet 5 in connection with the cores 2 provide a magnetic field which retains the signal flag 11 during non-operating periods in the lower position, shown in full lines in Fig. 4.

In operation the signal flag 11 is held during non-operating periods by the permanent bar magnet 5 in lowered position. When a signal current is received its passage through the coils is in such a direction as to neutralize the magnetic force of the permanent magnet, thus releasing flag 11. The spring 12 will then tend to lift the signal flag 11 into the upper operating position and the user of the telephone will recognize that a signal has been received.

The present telephone drop has as a particular feature the permanent magnetic means which retains the signal flag in non-operating position, the signal flag being moved to the operating position upon neutralization of the magnetic force. The second important feature is that the coils and the electrical circuits are sealed within a container or housing, and the signalling drop is controlled by the joint action of permanent and electromagnetic means active through the container wall.

While I have disclosed the principles of my invention in connection with a single embodiment, it will be understood that this embodiment is given by way of example only and not as limiting the scope of the invention as set forth in the objects and the appended claims.

I claim:

1. In a telephone drop, a mounting plate, two cores secured to said mounting plate, a coil surrounding each of said cores, a permanent magnet connecting one end of said cores, a signal member supported by said mounting plate, said signal member being adapted to be retained in one position by said permanent magnet, and means providing for movement of said signal member from said one position to another position upon neutralization of said permanent magnet force by a current passing through said coils.

2. In a telephone drop, a mounting plate, two cores with one end of each secured to said mounting plate, a coil surrounding each of said cores, a permanent magnet connecting the other ends of said cores, a signal member, means movably supporting said signal member on said plate, spring means adapted to move said signal member from a position overlapping said one ends of said cores, said signal member being retained in such overlapping position by said permanent magnet and in a different position by said spring means when the signal member is released upon neutralization of the force of said permanent magnet.

3. In a telephone drop, a mounting plate having an inner and outer side, two cores secured to the inner side of said mounting plate and penetrating through the latter, a coil surrounding each of said cores, a permanent magnet connecting the inner end of said cores, a signal member provided on the outside of said mounting plate in overlapping relation with respect to the outer ends of said cores, said signal member being attracted to such overlapping position by the magnetic action of said permanent magnet, and spring means to move said signal member from said overlapping position upon neutralization of the magnetic force of said magnet.

WALTER A. MINER, Jr.